Jan. 14, 1958     J. S. MURRAY     2,820,126
WIPER ASSEMBLY FOR AUTOMATIC SWITCHES
Filed Dec. 16, 1954

INVENTOR.
JAMES S. MURRAY
BY
ATTY.

United States Patent Office 2,820,126
Patented Jan. 14, 1958

2,820,126

WIPER ASSEMBLY FOR AUTOMATIC SWITCHES

James S. Murray, Tampa, Fla., assignor to General Telephone Laboratories, Incorporated, a corporation of Delaware Application December 16, 1954, Serial No. 475,739

2 Claims. (Cl. 200—166)

The present invention relates to automatic switches used in telephone or like applications, and more particularly, to improved contact-making wipers for use on such switches.

Generally in switches of this type the moving contact member is adapted to successively engage a set of fixed, spaced and coplanar contacts in a slidable manner. Such slidable engagement necessarily causes rapid wear of the contact surfaces. In view of today's high speed switching requirements and heavy traffic conditions, the life of contact surfaces is receiving increasing attention, and under the current high rate of usage the economic advantages of a low friction roller contact on a wiper may outweigh those of a sliding contact requiring frequent replacement. It was to meet this need for longer lasting contact surfaces in telephone switching that the present invention was conceived.

The principal object of this invention is to provide a switch wiper with a revoluble contact which will overcome the rapid wear associated with sliding contacts.

Another object of this invention is to provide a long wearing contacting surface on the revoluble contact to further increase wiper contact life.

A further object of this invention is the provision of means for readily replacing the wiper contact without disturbing the remainder of the wiper assembly or switch.

A still further object of this invention is the provision of a wiper assembly which will not catch or jam between levels of a switch bank as readily as the sliding contact type wiper.

Yet a further object of this invention is to provide a means for preventing high resistance contacts between the wiper and fixed contacts and "bridging" between adjacent fixed contacts caused by the characteristic wearing of sliding type contacts.

The invention will be better understood from the following description of the preferred embodiment of the inventive idea which should be taken in conjunction with the accompanying drawings, wherein:

Figures 1–3 being examples of various blade forms, Figure 4 a bearing pin and Figure 5 the wiper contact.

Figure 1:
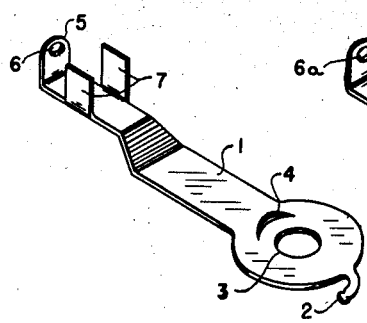
Figures 1–5 illustrate the various wiper tip components enlarged for clarity.

Referring first to Figure 1, the wiper blade 1 is constructed as a metal punching of the formation shown, having an electrical terminal 2 extending from its heel end and an aperture 3 at its pivot point through which passes the switch shaft (not shown). The crescent cutout 4 provides flexibility. The tip end 5 has an aperture 6 therethrough, and extensions or wings 7 are located a short distance back from the aperture 6. The tip end 5 is bent upwards to form a right angle with the blade proper. Similarly the wings 7 are bent upward to form a holding device.

Figure 4:
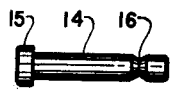
Figure 5:
Figure 6:
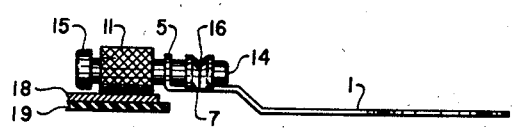
Figure 6 is an elevation view of the wiper tip assembly according to the invention.
Figure 7:
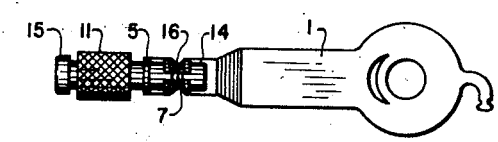
Figure 7 is a plan view of the wiper tip assembly.

In assembling the unit the roller 11 of Figure 5 is mounted on the bearing pin 14 of Figure 4 in the position shown in Figures 6 and 7 by passing the pin 14 through the aperture 12 in roller 11. A highly conductive lifetime lubricant is used on the bearing surfaces. The bearing pin 14 with the roller 11 positioned thereon is thrust through the aperture 6 in the blade tip 5 and is held in place on the blade 1 by folding the wings 7 over the grooved portion 16 of the pin 14 and pinching the wings 7 into the groove. Spreading the wings 7 slightly with a small tool permits ready replacement of the roller 11 and bearing pin 14 without necessitating removal of the entire wiper or switch.

Figure 2:
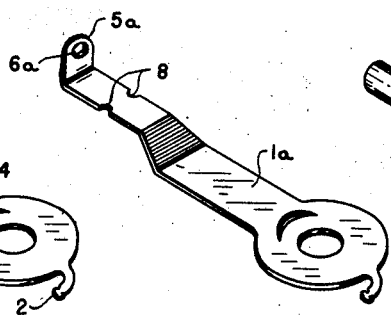
Figure 3:
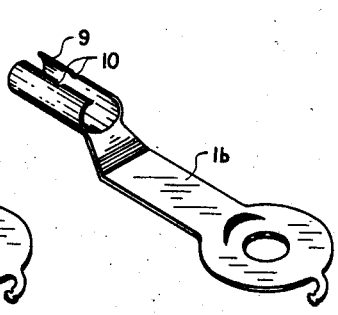

Figures 2 and 3 illustrate modified forms of the wiper blade of Fig. 1, having other fastening means which may be utilized in the preferred embodiment. In Figure 2 there is an aperture 6a through the bent up tip end 5a as in Figure 1, but rather than wings the blade 1a has grooves 8 cut therein. A device of the form of a staple is wrapped around the blade 1a through the grooves 8 of the blade and the groove 16 of the bearing pin 14 to hold the pin in place.

In the blade 1b of Figure 3 the tip end 9 is rectangular in shape and is bent upwards to form a sleeve as shown. The bearing pin 14 is then inserted in the sleeve which is pressed around the pin 14 and crimped into the bearing groove 16 at the notch 10 of the sleeve 9.

Figures 6 and 7 show the wiper completely assembled utilizing the blade 1 of Figure 1. End play clearance is provided for the roller 11 between the enlarged end 15 of the bearing pin 14 and the blade tip 5.

Figure 8:
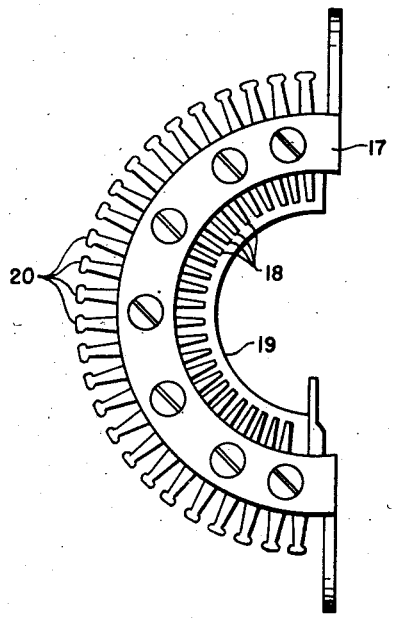
Figure 8 is a plan view of a level of the fixed contact switch bank.

The fixed contact switch bank 17 of Figure 8 is employed in the preferred embodiment. Such banks are well-known in the art and may include a plurality of rows or levels of contacts such as 18. The fixed contacts 18 are spaced equally about an arc abutting on a strip of insulation 19 and having terminals 20 for external electrical connection. Figure 6 shows a fixed contact 18 and the insulation strip 19 of the bank 17 in cross section, the fixed contact 18 being in contact with the roller 11.

The roller 11 is knurled as shown on surface 13 in the preferred embodiment to provide numerous points of contact with the fixed contacts 18 of the switch bank 17 at any position of the roller 11. The type of knurling provided does not have sharp points which might injure the fixed bank contacts. Less wear is encountered with this type of surface than with the smooth, sliding contact surface. Other irregular surfaces such as gear teeth may also be utilized to give the desired effect. This feature plus the rotation of the moving contact will extend the life of the contacts.

The sliding type contact shows a tendency to wear flat at the end thus broadening and increasing the area of contact with a possibility of "bridging" between fixed contacts. Also with increasing size the likelihood of undesirable high resistance connections increases. In the roller type contact of the present application there is uniform wear throughout the contact surface. The roller remains round thus maintaining a low resistance contact and preventing "bridging."

The sliding contact wiper is also prone to catch or jam between levels of a switch bank when the switch fails to raise the wiper to the proper height prior to rotary motion across the bank contacts. A roller contact, in such a situation would tend to roll over the end of the bank and onto the contacts instead of jamming into the end.

While the features of this invention have been disclosed with reference to a specific embodiment only, it is understood, of course, that various modifications may be made in the details of construction without departing from the scope of this invention.

What is claimed is:

1. A wiper for use in a switch mechanism having a set of fixed contacts, comprising a conducting resilient member having a terminal and pivotal point at its heel end and plurality of upturned flanges at its tip end, said member extending from and disposed to rotate about an axis including said pivotal point, a bearing pin having a groove at one end, a cylindrical contacting member having an aperture extending longitudinally therethrough and said bearing pin being mounted in said aperture to enable rotation of said contacting member on said pin, an aperture in one of said flanges, said bearing pin mounted so as to extend through said flange aperture and removably fastened to said conducting member by pinching other of said flanges into said groove, said contacting member disposed to rotate about said bearing pin and engage said fixed contacts with a rolling action when moved thereover.

2. A rotary wiper for use in a switch mechanism having a set of fixed, spaced, and substantially coplanar contacts, comprising a conductive wiper arm, a bearing pin, and a cylindrical contact; the base portion of said wiper arm having the shape of a flat washer with a coplanar flat strip extending in a radial direction from one edge thereof and a short extension at the edge diametrically opposite said one edge forming an electrical terminal, said flat strip having two equal and opposite transverse bends therein so that the tip portion thereof extends in said radial direction in a parallel plane slightly above the plane of said washer shaped portion, said tip portion having a perforated upturned flange at the end thereof and two upturned flanges along the opposite sides thereof; said bearing pin comprising a cylindrical rod of conductive material having a shoulder at one end and a groove at the other end, being removably mounted in said radial direction at said tip portion of said wiper arm so as to extend through the perforation in said perforated upturned flange with said other two flanges tightly crimped into said groove, the shoulder and part of said rod thereby extending beyond the end of said wiper arm; and said cylindrical contact comprising a cylinder of conductive material having a knurled outside surface and an inside diameter slightly larger than the diameter of said rod, being mounted on said bearing pin between said shoulder and said perforated flange, rotation of said wiper arm about the axis formed by the center of said washer shaped portion being effective to cause said cylindrical contact to engage said coplanar contacts with a rolling action, whereby said knurled surface thereof is effective to cause a multi-point electrical connection with each of said coplanar contacts.

References Cited in the file of this patent

UNITED STATES PATENTS

| | | |
|---|---|---|
| 676,098 | Papin | June 11, 1901 |
| 848,398 | Roberts | Mar. 26, 1907 |
| 2,135,809 | Fruth | Nov. 8, 1938 |
| 2,339,063 | Deakin | Jan. 11, 1944 |